E. F. LUCE.
CAR DOOR HANGER.
APPLICATION FILED NOV. 15, 1907.
907,827. Patented Dec. 29, 1908.
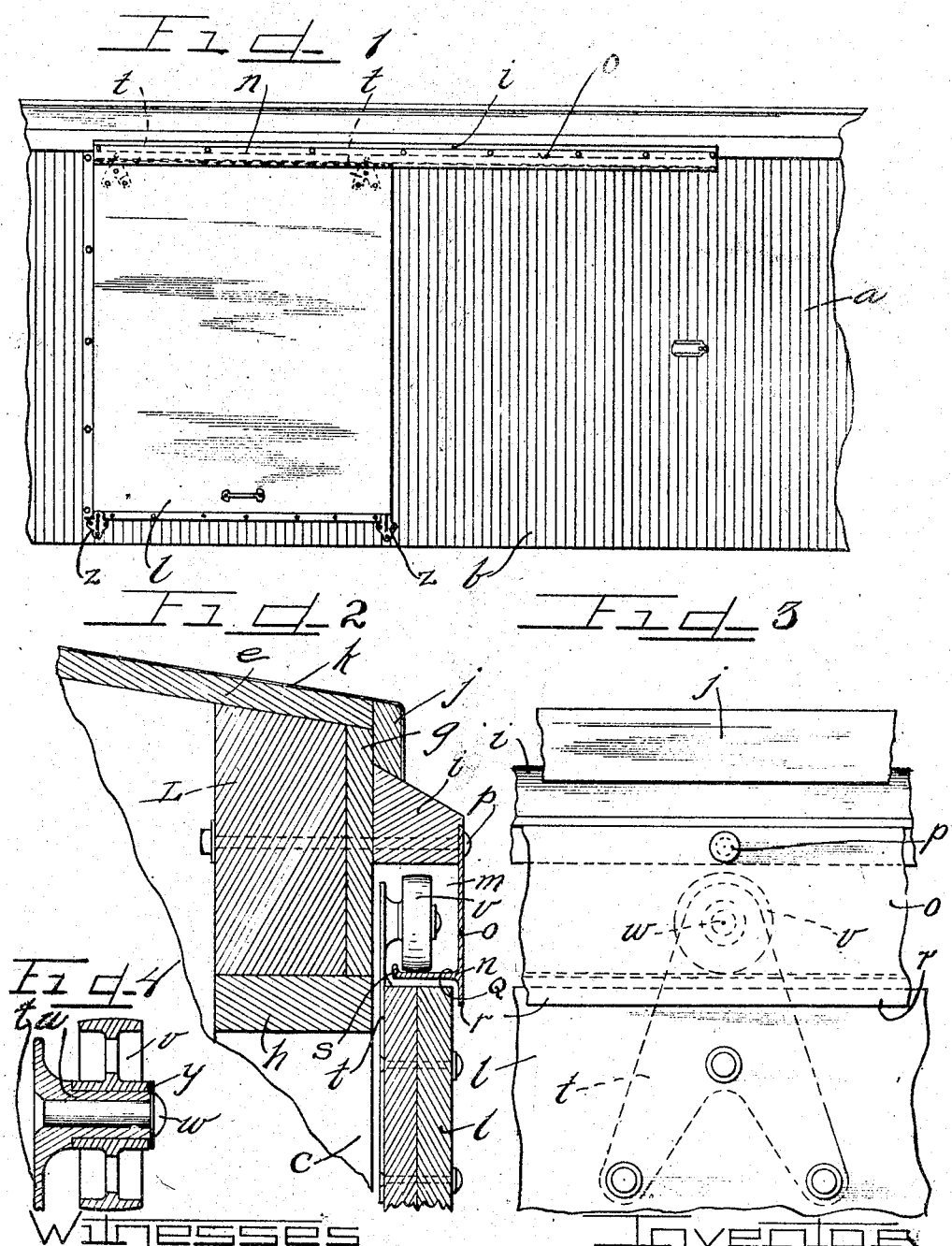

UNITED STATES PATENT OFFICE.

EDWARD F. LUCE, OF CHICAGO, ILLINOIS.

CAR-DOOR HANGER.

No. 907,827.   Specification of Letters Patent.   Patented Dec. 29, 1908.

Application filed November 15, 1907. Serial No. 402,320.

*To all whom it may concern:*

Be it known that I, EDWARD F. LUCE, a citizen of the United States, residing in Chicago, in the county of Cook and State of Illinois, have invented certain new and useful Improvements in Car-Door Hangers, of which the following is a specification.

This invention relates to track and hanger mechanisms for car doors.

The principal object of the invention is to provide a simple, economical and efficient and so far as possible storm-proof car door supporting track and hanger mechanism.

A further object is to provide a railway car with a door supporting track and hanger mechanism so constructed and arranged as to provide a sufficiently strong and efficient support for the door or doors while occupying the minimum amount of space transversely of the car, and adapted to render the car and its door mechanism as nearly as possible storm-proof and protect the contents of the car and the door hanger mechanism from the injurious effects of the elements, snow, rain, sleet, cinders and the like, all in such a manner as to permit the interior width of the car to be as great as possible consistent with the established or standard limitations as to outside width.

Other and further objects of the invention will appear from an examination of the drawings and the following description and claims.

The invention consists in the features, combinations, and details of construction hereinafter described and claimed.

In the accompanying drawing Figure 1 is a side view of a railway car provided with my improvements, with certain parts of the car broken away or omitted; Fig. 2, a sectional transverse elevation in detail of a portion of the car showing the door supporting track in cross-section, and the upper edge of the door and the hanger mechanism inclosed and sheltered thereby, the hanger brackets extending upward from the door on the inside of the track and between it and the side of the car; Fig. 3 a view in side elevation of the parts shown in Fig. 2; and Fig. 4, an enlarged detail view in sectional elevation of the upper portion of the door hanger shown in Fig. 2.

In the drawings, my improved car-door supporting track and hanger mechanism is shown in connection with a car body $a$ having a side wall $b$ which is provided with a doorway $c$. A filler $i$ is secured to the side wall of the car body over the doorway and a sufficient distance above the latter to provide a space $m$ beneath the filler and between said filler and the top of the door for admitting and containing the portions of the track and hanger mechanism which it is desirable should be located between the top of the door and the filler in position to be inclosed and sheltered as shown in Fig. 2. A door $l$ is mounted beneath the track supporting member or filler in position to leave a space between the upper edge of the door and the filler, said door being adapted to be moved to and from position to close the doorway.

A track $n$, formed preferably of metal, is provided, having an upright outer side portion $o$ which is secured to the track supporting member or filler $i$ by means of bolts $p$ which extend preferably through the track.

The outer side of the filler is countersunk or recessed sufficiently to admit and cover the upper edge of the track where it is in contact with or secured to the filler. The vertical outer side portion $o$ of the track extends downward from the filler or track supporting member, on the outside of and to a point below the level of the upper edge of the door, so that the lower edge or depending portion $r$ of the track is adapted to exclude snow, sleet, rain and cinders and the like from the space $m$ and from the interior of the car. Mounted upon and preferably integral with the outer portion $o$ of the track is an inwardly extending track portion $q$ which has a preferably flat horizontal upper surface and the inner edge of which is provided with an upwardly extending guiding flange $s$. The inner flanged edge of this inwardly extending hanger-engaging portion of the track is adjacent to the inner edge of the door and a sufficient distance from the side of the car body to provide a space which will admit the hanger arms or brackets, hereinafter described, and permit them to move freely back and forth longitudinally of the track and car in opening and closing the door. The outer edge of said inner track portion is connected with the outer web or track portion $o$. The door is provided with suitable hangers preferably consisting of hanger arms or brackets $t$ secured to the door and extending upward from the inner upper edge of the door on the inside of the track and between the inner edge of the inner inclosed portion of the track and the car body, each of said arms or brackets having at its upper end an axle or laterally projecting arm portion $u$ upon which is mounted an antifriction door supporting wheel or member $v$ which rests upon the upper surface of the inclosed inwardly extending portion $q$ of the track. The wheels are held in rotatable position by means of headed bolts or rivets $w$ and washers $y$. The hangers—and thereby the door supported thereby—are guided and kept in their proper course by means of the upwardly projecting inner flange $s$ already described, which limits the inward movement of the angers by engaging the hanger wheels, and in a similar manner limits the outward movement of the hangers and door by engaging the hanger brackets or arms $t$ at the points where they extend between the inner edge of the track and the car body.

It will be noted that the above described construction and arrangement of the track and hangers renders the device practically storm-proof to the extent not only of sheltering the hangers and hanger supporting portion of the track but to the extent of excluding snow and rain and other injurious elements from the interior of the car thus preserving the contents from injury and at the same time enabling the maximum interior width and the maximum available transverse load carrying space or capacity of the car to be obtained and utilized without increasing the width from outside to outside, the transverse space occupied or monopolized by the door-supporting track and hanger and sheltering device being reduced to a minimum. It follows that by thus minimizing the transverse space occupied by the door supporting and storm excluding device the danger of injury to the doors and door supports is minimized.

The means for guiding and holding the lower edge of the door may be of any ordinary and well known form, and may consist of brackets $z$ arranged at suitable intervals. The track should extend lengthwise of the car body a distance preferably substantially equal to twice the width of the door and should not extend out transversely further than is necessary to enable it to inclose the upper edge of the door and permit the necessary freedom of movement.

I claim:

1. In a door hanger, the combination with a car body having a doorway and a door, of hanger mechanism secured to and extending over the door, and a track comprising in its construction an inner portion extending over the door and in supporting engagement with the hanger mechanism, an outer vertical portion extending outside of and inclosing between it and the car body the entire track-engaging portion of the hanger mechanism, and an extended portion adapted to extend outside of and below the upper edge of the door.

2. In a car door hanger, the combination with a car body having a doorway and door, of hanger arms secured to the inner side of the door, hanger wheels directly over the door and connected with said hanger arms, and a track comprising in its construction an inner portion extending over the door beneath and in supporting engagement with said hanger wheels, an outer vertical portion connected with the outer edge of said inner track portion and extending outside of and inclosing the hanger wheels between it and the car body, and an extended portion adapted to extend outside of and below the upper edge of the door.

3. In a car door hanger, the combination with a car body having a doorway and door, of hanger arms secured to the inner side of the door, hanger wheels directly over the door and connected with said hanger arms, a track comprising in its construction an inner horizontal portion over the door beneath and in supporting engagement with the hanger wheels, a flange on said inner track portion and in guiding engagement with the hanger wheels, and an outer vertical portion connected with and extending above and below the outer edge of said inner track portion and adapted to extend outside of the hanger wheels and outside of and downward below the hanger wheel-engaging portion of the track and the upper edge of the door, and means for supporting the track from the car body.

EDWARD F. LUCE.

Witnesses:
HARRY IRWIN CROMER,
NELLIE E. GEORGE.